United States Patent

Degen et al.

[11] 4,301,272
[45] Nov. 17, 1981

[54] ADDITION POLYMERS OF DIMORPHOLONE COMPOUNDS AND DIAMINES

[75] Inventors: Hans-Juergen Degen, Lorsch; Herbert Naarmann, Wattenheim, both of Fed. Rep. of Germany

[73] Assignee: BASF Aktiengesellschaft, Fed. Rep. of Germany

[21] Appl. No.: 126,289

[22] Filed: Mar. 3, 1980

[30] Foreign Application Priority Data

Mar. 22, 1979 [DE] Fed. Rep. of Germany ....... 2911263

[51] Int. Cl.³ .............................................. C08G 69/00
[52] U.S. Cl. .................................... 528/183; 528/176; 528/184; 528/208; 528/210; 528/211; 528/310; 528/327; 528/328; 528/331
[58] Field of Search ............... 528/327, 328, 184, 176, 528/183, 208, 210, 211, 310, 331

[56] References Cited

U.S. PATENT DOCUMENTS 3,526,608 9/1970 Berg et al. .................. 260/29.2 EP
3,640,840 2/1972 Zieman et al. ...................... 162/164
4,018,850 4/1977 Yoshida ................................ 428/425
4,139,689 2/1979 Hochreuter et al. .............. 526/52.4

OTHER PUBLICATIONS

Journal of the American Chemical Society, 77, (1955), pp. 633–636.

*Primary Examiner*—Harold D. Anderson
*Attorney, Agent, or Firm*—Keil & Witherspoon

[57] ABSTRACT

Novel addition polymers of dimorpholone compounds and diamines, which contain structural units of the general formula

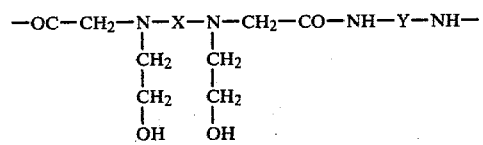

where X and Y may be various conventional organic radicals, are obtained by reacting dimorpholone compounds with diamines. The polymers may be used for modifying plastics, and for textile or paper finishing.

2 Claims, No Drawings

ADDITION POLYMERS OF DIMORPHOLONE COMPOUNDS AND DIAMINES

The present invention relates to novel polymers having K values of from 20 to 65, their preparation, and their use for modifying polymers and for textile or paper finishing.

It is an object of the present invention to provide polymers which consist of carbamide units containing hydroxyethyl groups.

We have found that this object is achieved by providing polymers with K values of from 20 to 65, which contain structural units of the general formula (I)

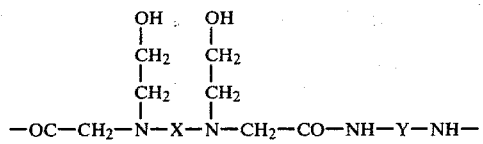

where X and Y are identical or different and are —($CH_2$—$CH_2$)$_n$—, where n is from 1 to 6, or are

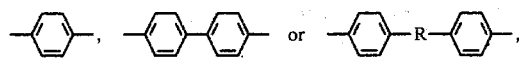

where R is O, S, $SO_2$, $C(CH_3)_2$ or $CH_2$, or are

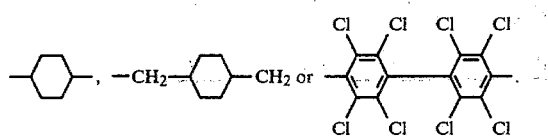

It is a further object of the present invention to provide a method of preparing the above polymers.

We have found that this object is achieved by a process wherein a dimorpholone compound of the general formula (II)

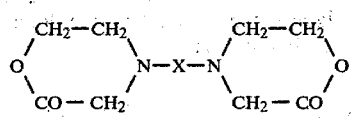

where X is one of the above groups, is reacted with a diamine of the general formula (III)

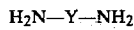

where Y may be identical with or different from X and is one of the above groups, in the molar ratio of 1:1, at from 40° to 300° C., in the presence or absence of a solvent.

Polymers with K values of from 20 to 65, which contain structural units of the general formula (I), are homopolymers comprising recurring units of the general formula (I), the K value being the technical parameter for characterizing the degree of polymerization and being measured by the method of H. Fikentscher, Cellulosechemie 13 (1932) 58–64 and 71–74, using a one percent strength by weight solution in dimethylformamide at 25° C.; $K = k \cdot 10^3$. Preferred polymers have K values of from 22 to 45. The polymers according to the invention contain n structural units (I), n being an integer from 5 to 1,000, preferably from 20 to 250.

The novel polymers are prepared by reacting a dimorpholone compound (II) with a diamine of the general formula (III) in the molar ratio of 1:1 at from 40° to 300° C., preferably from 90° to 250° C. The reaction may be carried out under atmospheric pressure or superatmospheric pressure. In the latter case, the reaction is preferably carried out under a pressure of up to 20 bar. Where desired, the reaction may also be carried out in the presence of a solvent, e.g. dioxane, dimethylformamide or N-methylpyrrolidone, or of a solvent mixture. The dimorpholone compounds (II) may be synthesizd by the process described by A. R. Surrey et al. in J. Amer. Chem. Soc. 77 (1955), 633–636.

The novel polymers obtained by the process according to the invention may be used for antistatic finishing of fibers, for modifying polymers, and as components of mixtures used for textile and/or paper finishing.

EXAMPLE 1

288 parts by weight of the dimorpholone

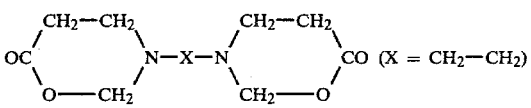

and 60 parts by weight of the diamine $H_2N$—Y—$NH_2$ (where Y=$CH_2$—$CH_2$), in 400 parts by weight of N-dimethylformamide, are heated for 5 hours at 120° C. in a reaction flask, and the solvent is then stripped off at 100° C. under 3 mm Hg. 280 parts by weight of a light brown residue, having a K value of 25, remain.

EXAMPLES 2 to 8

The reaction of the various dimorpholones and diamines is carried out by the method described in Example 1. The Table which follows summarizes the results.

TABLE

| Example No. | Starting material (II) X | parts by weight | Starting material (III) $H_2N$—Y—$NH_2$ Y | parts by weight | Yield (I) (parts by weight) | K value |
|---|---|---|---|---|---|---|
| 2 | $(CH_2)_4$ | 256 | $(CH_2)_4$ | 88 | 340 | 34 |
| 3 | $(CH_2)_6$ | 284 | $(CH_2)_6$ | 116 | 390 | 36 |
| 4 | ⌬ | 276 | ⌬ | 108 | 375 | 38 |

TABLE-continued

| Example No. | Starting material (II) X | parts by weight | Starting material (III) H₂N—Y—NH₂ Y | parts by weight | Yield (I) (parts by weight) | K value |
|---|---|---|---|---|---|---|
| 5 | ⌬—O—⌬ | 368 | ⌬—O—⌬ | 200 | 560 | 29 |
| 6 | ⌬—SO₂—⌬ | 416 | ⌬—SO₂—⌬ | 248 | 655 | 32 |
| 7 | ⌬—CH₂—⌬ | 366 | ⌬—CH₂—⌬ | 198 | 650 | 44 |
| 8 | ⌬—⌬ | 352 | ⌬—⌬ | 184 | 530 | 45 |
| 9 | CH₂—⬡—CH₂ | 310 | CH₂—⬡—CH₂ | 140 | 440 | 34 |
| 10 | Cl₄-C₆-C₆-Cl₄ | 628 | (CH₂)₂ | 60 | 675 | 22 |
| 11 | ⌬ | 276 | (CH₂)₂ | 60 | 330 | 29 |
| 12 | ⌬—O—⌬ | 368 | (CH₂)₂ | 60 | 425 | 32 |
| 13 | (CH₂)₄ | 256 | ⌬—O—⌬ | 200 | 450 | 34 |
| 14 | (CH₂)₄ | 256 | CH₂—H—CH₂ | 140 | 390 | 36 |

We claim:

1. A polymer with a K value using a 1% strength of weight solution in dimethylformamide at 25° C. of from 20 to 65, which contains structural units of the general formula (I)

$$-OC-CH_2-\underset{\underset{CH_2}{\overset{CH_2}{|}}}{\overset{OH}{\underset{|}{N}}}-X-\underset{\underset{CH_2}{\overset{CH_2}{|}}}{\overset{OH}{\underset{|}{N}}}-CH_2-CO-NH-Y-NH- \quad I$$

where X and Y are identical or different and are —(CH₂—CH₂)ₙ—, where n is from 1 to 6, or are

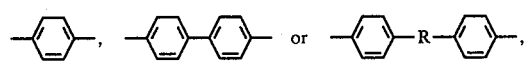

where R is O, S, SO₂, C(CH₃)₂ or CH₂, or are

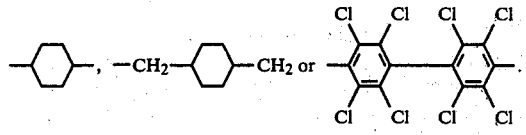

2. A process for the preparation of a polymer as claimed in claim 1, wherein a dimorpholone compound of the general formula (II)

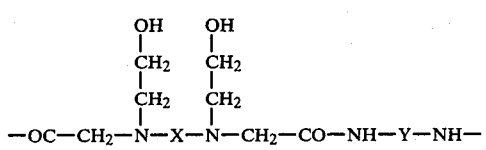

where X is one of the above groups, is reacted with a diamine of the general formula (III)

H₂N—Y—NH₂    III where Y may be identical with or different from X and is one of the above groups, in the molar ratio of 1:1, at from 40° to 300° C., in the presence or absence of a solvent.

* * * * *